United States Patent [19]

Etzbach et al.

[11] Patent Number: 5,389,596
[45] Date of Patent: Feb. 14, 1995

[54] DYE MIXTURES FOR DYE TRANSFER

[75] Inventors: Karl-Heinz Etzbach, Frankenthal; Gunther Lamm, Hassloch; Ruediger Sens, Mannheim, all of Germany

[73] Assignee: BASF Aktiengesellschaft, Ludwigshafen, Germany

[21] Appl. No.: 59,132

[22] Filed: May 10, 1993

[30] Foreign Application Priority Data

May 12, 1992 [DE] Germany .............................. 4215535

[51] Int. Cl.⁶ ....................... B41M 5/035; B41M 5/38
[52] U.S. Cl. .......................................... 503/227; 8/471; 8/639; 106/22 K; 428/195; 428/913; 428/914
[58] Field of Search .......................... 8/471, 638, 639; 428/195, 913, 914; 503/227; 106/23 K, 22 K

[56] References Cited

U.S. PATENT DOCUMENTS

| 4,939,118 | 7/0390 | Etzbach et al. | 503/227 |
| 5,079,365 | 1/1992 | Sens et al. | 546/119 |

FOREIGN PATENT DOCUMENTS

| 399473 | 11/1990 | European Pat. Off. | 503/227 |
| 441282 | 8/1991 | European Pat. Off. | 503/227 |
| 9200505 | 1/1992 | WIPO | 428/694 |

*Primary Examiner*—B. Hamilton Hess
*Attorney, Agent, or Firm*—Oblon, Spivak, McClelland, Maier & Neustadt

[57] ABSTRACT

Thermal transfer dye mixtures comprise at least one azo dye with a coupling component of the diaminopyridine series and at least one triazolopyridine, pyridone and/or 1-aminopyrid-2,6-dione dye.

6 Claims, No Drawings

DYE MIXTURES FOR DYE TRANSFER

The present invention relates to novel dye mixtures comprising at least one azo dye of the formula I

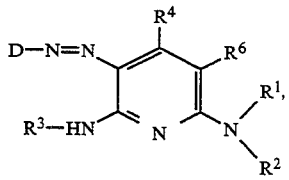

where $R^1$, $R^2$ and $R^3$ are identical or different and each is independently of the others alkyl, alkoxyalkyl, alkanoyloxyalkyl, alkoxycarbonyloxyalkyl or alkoxycarbonylalkyl, each of which may have up to 20 carbon atoms and be phenyl-, $C_1$-$C_4$-alkylphenyl-, $C_1$-$C_4$-alkoxyphenyl-, halophenyl-, benzyloxy-, $C_1$-$C_4$-alkylbenzyloxy-, $C_1$-$C_4$-alkoxybenzyloxy, halo -benzyloxy-, halogen-, hydroxyl- or cyano-substituted, hydrogen, unsubstituted or $C_1$-$C_4$-alkyl- or $C_1$-$C_4$-alkoxy-, halogen- or benzyloxy-substituted phenyl, unsubstituted or $C_1$-$C_4$-alkyl-, $C_1$-$C_4$-alkoxy-, halogen- or benzyloxy-substituted cyclohexyl or a radical of the formula

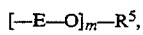

where

E is $C_2$-$C_6$-alkylene,

M is 1, 2, 3, 4, 5 or 6, and $R^5$ is $C_1$-$C_4$-alkyl or unsubstituted or $C_1$-$C_4$-alkyl- or $C_1$-$C_4$-alkoxy-substituted phenyl, $R^4$ is $C_1$-$C_4$-alkyl, $R^6$ is cyano or carbamoyl, and D is the radical of a diazo component, and at least one dye of the formula II, III and/or IV

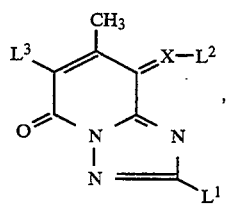

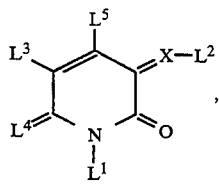

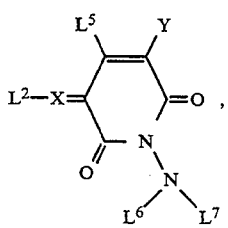

where $L^1$ is $C_1$-$C_{20}$-alkyl, which may be substituted and may be interrupted by from 1 to 4 oxygen atoms in ether function, substituted or unsubstituted phenyl or hydroxyl, $L^2$ is a 5- or 6-membered carbocyclic or heterocyclic radical, $L^3$ is cyano, carbamoyl, carboxyl or $C_1$-$C_4$-alkoxycarbonyl, $L^4$ is oxygen or a radical of the formula

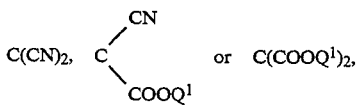

where $Q^1$ is in each case $C_1$-$C_8$-alkyl, which may be interrupted by 1 or 2 oxygen atoms in ether function, X is CH or nitrogen, $L^5$ is hydrogen or $C_1$-$C_4$-alkyl, $L^6$ and $L^7$ are identical or different and each is independently of the other hydrogen, substituted or unsubstituted $C_1$-$C_{12}$-alkyl, $C_5$-$C_7$-cycloalkyl, substituted or unsubstituted phenyl, substituted or unsubstituted pyridyl, substituted or unsubstituted $C_1$-$C_{12}$-alkanoyl, $C_1$-$C_{12}$-alkoxycarbonyl, substituted or unsubstituted $C_1$-$C_{12}$-alkylsulfonyl, $C_5$-$C_7$-cycloalkylsulfonyl, substituted or unsubstituted phenylsulfonyl, substituted or unsubstituted pyridylsulfonyl, substituted or unsubstituted benzoyl, pyridylcarbonyl or thienylcarbonyl, or together with the nitrogen atom joining them together are unsubstituted or $C_1$-$C_4$-alkyl-substituted succinimido, unsubstituted or $C_1$-$C_4$-alkyl-substituted phthalimido or a five- or six-membered saturated heterocyclic radical, which may contain further hetero atoms, Y is cyano or a radical of the formula $CO$—$Q^2$, $CO$—$OQ^2$ or $CO$—$NHQ^2$, where $Q^2$ is hydrogen, $C_1$-$C_8$-alkyl, which may be substituted and may be interrupted by 1 or 2 oxygen atoms in ether function, $C_5$-$C_7$-cycloalkyl, phenyl or tolyl, and also to a process for the thermal transfer thereof.

In the thermal transfer printing process, a transfer sheet, which contains a thermally transferable dye in one or more binders with or without suitable assistants on a substrate, is heated from the back with an energy source, for example a thermal head or a laser, in the form of short heating pulses (duration: fractions of a second), causing the dye to migrate out of the transfer sheet and diffuse into the surface coating of a receiving medium. The essential advantage of this process is that the amount of dye to be transferred, and hence the color gradation, is readily controlled by controlling the energy to be emitted by the energy source.

In general, color recording involves the use of the three subtractive primaries yellow, magenta and cyan (with or without black).

It is known to carry out the thermal transfer printing process with individual dyes or else with mixtures of dyes. However, it has been found that the dyes that are employed still have application defects.

It is an object of the present invention to provide novel dye mixtures in the magenta region that shall be advantageous for thermal transfer.

We have found that this object is achieved by the dye mixtures defined at the beginning.

D can be derived for example from a diazo component of the aniline, phenylazoaniline, aminothiophene, phenylazoaminothiophene, aminothiazole, phenylazoaminothiazole, aminoisothiazole or aminothiadiazole series.

$L^2$ can be derived for example from components of the benzene, indole, quinoline, aminonaphthalene, aminothiazole or aminothiophene series.

Emphasis is given to dye mixtures comprising at least one azo dye of the formula I where the radical D is derived for example from a diazo component D-NH$_2$ of the formula

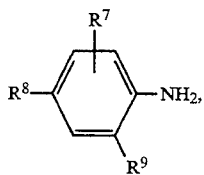 (Va)

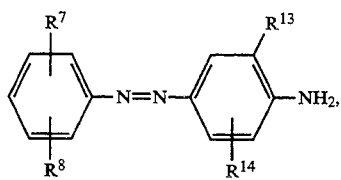 (IVb)

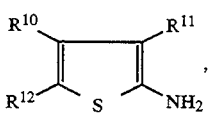 (Vc)

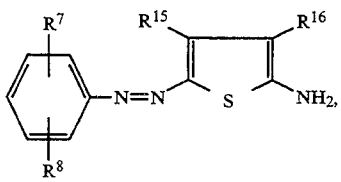 (Vd)

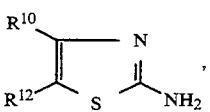 (Ve)

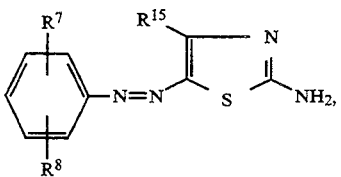 (Vf)

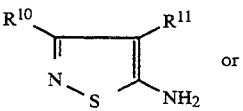 (Vg)

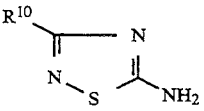 (Vh)

where $R^7$, $R^8$ and $R^9$ are identical or different and each is independently of the others alkyl, alkoxyalkyl, alkoxycarbonylalkyl or alkanoyloxyalkyl, each of which may have up to 12 carbon atoms, hydrogen, cyano, halogen, nitro, a radical of the formula $$[-E-O]_m-R^5$$

where

E, $R^5$ and m are each as defined above, or a radical of the formula —CO—OR$^{17}$, —CO—NR$^{17}$R$^{18}$, —SO$_2$—R$^{17}$, —SO$_2$—OR$^{17}$ or SO$_2$—NR$^{17}$R$^{18}$, where $R^{17}$ and $R^{18}$ are identical or different and each is independently of the other alkyl, alkoxyalkyl, alkoxycarbonylalkyl or alkanoyloxyalkyl, each of which may have up to 12 carbon atoms, hydrogen or a radical of the formula $$[-E-O]_m-R^5$$

where

E, $R^5$ and m are each as defined above, $R^{10}$ is hydrogen, chlorine, cyano, $C_1$-$C_8$-alkyl, $C_1$-$C_8$-alkoxy, $C_1$-$C_8$-alkylthio, alkoxyalkyl, which may have up to 8 carbon atoms, phenyl, which may be $C_1$-$C_4$-alkyl-, $C_1$-$C_4$-alkoxy- or benzyloxy-substituted, benzyl, benzyloxy or a radical of the formula —CO—OR$^{17}$ or —CO—NR$^{17}$R$^{18}$, where $R^{17}$ and $R^{18}$ are each as defined above, $R^{11}$ is hydrogen, cyano, nitro or a radical of the formula —CO—R$^{17}$ or —CO—NR$^{17}$R$^{18}$, where $R^{17}$ and $R^{18}$ are each as defined above, $R^{12}$ is cyano, nitro, formyl or a radical of the formula $$-CO-OR^{17}, \quad -CO-NR^{17}R^{18}, \quad -CH=C\begin{matrix}CN\\CN\end{matrix},$$

$$-CH=C\begin{matrix}CN\\CO-OR^{17}\end{matrix} \quad \text{or} \quad -CH=C\begin{matrix}CN\\CO-NR^{17}R^{18}\end{matrix},$$

where $R^{17}$ and $R^{18}$ are each as defined above, $R^{13}$ and $R^{14}$ are identical or different and each is independently of the other hydrogen, $C_1$-$C_4$-alkyl, $C_1$-$C_4$-alkoxy, chlorine, cyano, nitro or a radical of the formula —CO—OR$^{17}$ or —CO—NR$^{17}$R$^{18}$, where $R^{17}$ and $R^{18}$ are each as defined above, $R^{15}$ is hydrogen, $C_1$-$C_4$-alkyl or chlorine, and $R^{16}$ is cyano or a radical of the formula —CO—OR$^{17}$ or —CO—NR$^{17}$R$^{18}$, where $R^{17}$ and $R^{18}$ are each as defined above.

Emphasis is further given to dye mixtures comprising at least one dye of the formula II, III and/or IV where $L^2$ is a radical of the formula

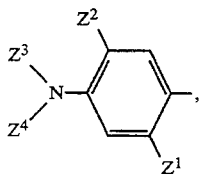 (VIa)

-continued

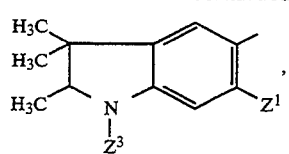

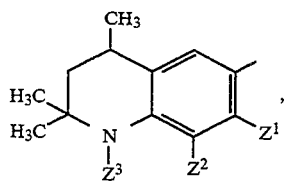

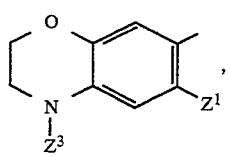

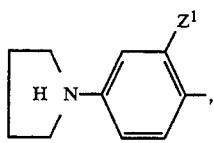

(VIe)

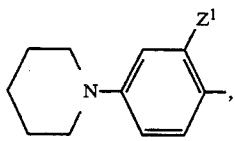

(VIf)

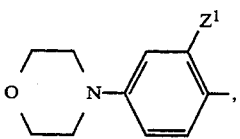

(VIg)

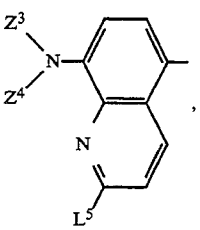

(VIh)

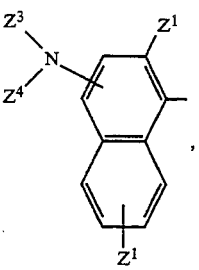

(VIi)

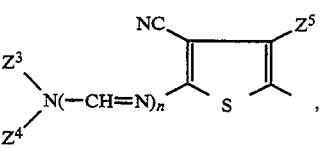

(VIj)

-continued

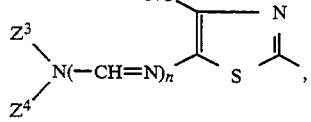 (VIb)

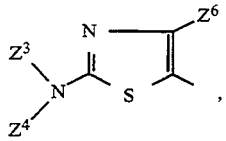 (VIc)

(VId)

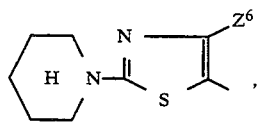

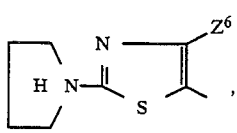

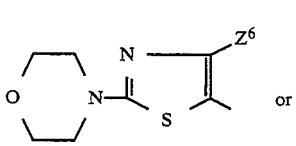

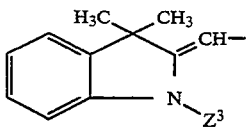 (VIk)

(VII)

(VIm)

(VIn)

(VIo) or (VIp)

where
n is 0 or 1, $Z^1$ is hydrogen, $C_1$–$C_8$-alkyl, which may be interrupted by 1 or 2 oxygen atoms in ether function, methoxy, ethoxy, $C_1$–$C_4$-alkylsulfonylamino, mono- or di($C_1$–$C_4$-alkyl)aminosulfonylamino, or the radical —NHCOZ$^7$ or —NHCO$_2$Z$^7$, where $Z^7$ is phenyl, benzyl, tolyl or $C_1$–$C_8$-alkyl, which may be interrupted by one or two oxygen atoms in ether function, $Z^2$ is hydrogen, methyl, methoxy or ethoxy, $Z^3$ and $Z^4$ are identical or different and each is independently of the other hydrogen, $C_1$–$C_8$-alkyl, which may be substituted and may be interrupted by one or two oxygen atoms in ether function, $C_3$–$C_4$-alkenyl, $C_5$–$C_7$-cycloalkyl, phenyl or tolyl, or together with the nitrogen atom joining them together are a five- or six-membered saturated heterocyclic radical, which may contain further hetero atoms, $Z^5$ is halogen, and $Z^6$ is hydrogen, halogen, $C_1$–$C_8$-alkyl, substituted or unsubstituted phenyl, substituted or unsubstituted benzyl, cyclohexyl, thienyl, hydroxyl or mono($C_1$–$C_8$-alkyl)amino, and $L^5$ is as defined above.

Any alkyl, alkylene or alkenyl appearing in the abovementioned formulae can be not only straight-chain but also branched.

Any substituted alkyl appearing in the above-mentioned formulae may have as substituents for example, unless otherwise stated, cyano, phenyl, tolyl, $C_1$–$C_6$- alkanoyloxy, $C_1$–$C_4$-alkoxycarbonyl, $C_1$–$C_4$-alkoxycarbonyloxy in which the alkoxy group may be substituted by phenyl or $C_1$–$C_4$-alkoxy.

Any substituted phenyl or pyridyl appearing in the abovementioned formulae may have as substituents for example halogen, $C_1$–$C_4$-alkyl or $C_1$–$C_4$-alkoxy.

E is for example ethylene, 1,2- or 1,3-propylene, 1,2-, 1,3-, 1,4- or 2,3-butylene, pentamethylene, hexamethylene or 2-methylpentamethylene.

$R^1$, $R^2$, $R^3$, $R^4$, $R^5$, $Z^1$, $R^7$, $R^8$, $R^9$, $R^{10}$, $R^{13}$, $R^{14}$, $R^{15}$, $R^{17}$, $R^{18}$, $L^1$, $L^5$, $L^6$, $L^7$, $Q^1$, $Q^2$, $Z^1$, $Z^3$, $Z^4$, $Z^6$ and $Z^7$ are each for example methyl, ethyl, propyl, isopropyl, butyl, isobutyl, sec-butyl or tert-butyl.

$R^1$, $R^2$, $R^3$, $R^7$, $R^8$, $R^9$, $R^{10}$, $R^{17}$, $R^{18}$, $L^1$, $L^6$, $L^7$, $Q^1$, $Q^2$, $Z^1$, $Z^3$, $Z^4$, $Z^6$ and $Z^7$ may each also be for example pentyl, isopentyl, neopentyl, tert-pentyl, hexyl, 2-methylpentyl, heptyl, octyl, 2-ethylhexyl or isooctyl.

$R^1$, $R^2$, $R^3$, $R^7$, $R^8$, $R^{17}$, $R^{18}$, $L^1$, $L^6$ and $L^7$, may each also be for example nonyl, isononyl, decyl, isodecyl, undecyl or dodecyl.

$R^1$, $R^2$, $R^3$ and $L^1$ may each also be for example tridecyl, isotridecyl, tetradecyl, pentadecyl, hexadecyl, heptadecyl, octadecyl, nonadecyl or eicosyl. (The designations isooctyl, isononyl, isodecyl and isotridecyl are trivial names derived from the alcohols obtained by the oxo process (cf. Ullmanns Enzyklopädie der technischen Chemie, 4th edition, volume 7, pages 215 to 217, and volume 11, pages 435 and 436).).

$R^1$, $R^2$, $R^3$, $R^7$, $R^8$, $R^{17}$, $R^{18}$, $Q^2$, $L^1$, $Z^1$ and $Z^7$ may each also be for example 2-methoxyethyl, 2-ethoxyethyl, 2-propoxyethyl, 2-butoxyethyl, 2- or 3-methoxypropyl, 2- or 3-ethoxypropyl, 2- or 3-propoxypropyl, 2- or 3-butoxypropyl, 2- or 4-methoxybutyl, 2- or 4-ethoxybutyl or 2- or 4-butoxybutyl.

$R^{10}$, $R^{13}$ and $R^{14}$ may each also be for example methoxy, ethoxy, propoxy, isopropoxy, butoxy, isobutoxy or sec-butoxy.

$R^{10}$ may also be for example pentyloxy, isopentyloxy, neopentyloxy, hexyloxy, heptyloxy, octyloxy, 2-ethylhexyloxy, methylthio, ethylthio, propylthio, isopropylthio, butylthio, pentylthio, hexylthio, heptylthio, octylthio or 2-ethylhexylthio.

$R^1$, $R^2$, $R^3$, $L^1$, $Q^2$ and $Z^1$ may each also be for example 3,6-dioxaheptyl, 3,6-dioxaoctyl, 4,8-dioxanonyl, 3,7-dioxaoctyl, 3,7-dioxanonyl, 4,7-dioxaoctyl, 4,7-dioxanonyl or 4,8-dioxadecyl.

$L^1$ may also be for example 3,6,9-trioxadecyl, 3,6,9-trioxaundecyl, 3,6,9,12-tetraoxatridecyl, 3,6,9,12-tetraoxatetradecyl, 2-methoxycarbonylethyl, benzyl, 1- or 2-phenylethyl, 3-benzyloxypropyl or 2-, 3- or 4-chlorophenyl.

$L^3$ may be for example methoxycarbonyl, ethoxycarbonyl, propoxycarbonyl, isopropoxycarbonyl, butoxycarbonyl, isobutoxycarbonyl, or sec-butoxycarbonyl.

$R^1$, $R^2$, $R^3$, $L^1$ and $Z^6$ may each also be for example phenyl, 2-, 3- or 4-methylphenyl, 2-, 3- or 4-ethylphenyl, 2-,3- or 4-propylphenyl, 2-, 3- or 4-isopropylphenyl, 2-, 3- or 4-butylphenyl, 2,4 -dimethylphenyl 2-, 3- or 4-methoxyphenyl, 2-, 3- or 4-ethoxyphenyl, 2-, 3- or 4-isobutoxyphenyl or 2,4-dimethoxyphenyl $L^6$ and $L^7$ may each also be for example phenyl, 2-, 3- or 4-methylphenyl, 2-, 3- or 4-methoxyphenyl, pyridyl, 2-, 3- or 4-methylpyridyl, 2-, 3- or 4-methoxypyridyl, formyl, acetyl, propionyl, butyryl, isobutyryl, pentanoyl, hexanoyl, heptanoyl, octanoyl, 2-ethylhexanoyl, methoxycarbonyl, ethoxycarbonyl, propoxycarbonyl, isopropoxycarbonyl, butoxycarbonyl, methylsulfonyl, ethylsulfonyl, propylsulfonyl, isopropylsulfonyl, butylsulfonyl, cyclopentylsulfonyl, cyclohexylsulfonyl, cycloheptylsulfonyl, phenylsulfonyl, tolylsulfonyl, pyridylsulfonyl, benzoyl, 2-, 3- or 4-methylbenzoyl, 2-, 3- or 4-methoxybenzoyl, thien-2-ylcarbonyl or thien-3-ylcarbonyl.

$R^1$, $R^2$, $R^3$, $Q^2$, $L^6$, $L^7$, $Z^3$ and $Z^4$ may each also be for example 2-cyanoethyl, 2- or 3-cyanopropyl, 2-acetyloxyethyl, 2- or 3-acetyloxypropyl, 2-isobutyryloxyethyl, 2- or 3-isobutyryloxypropyl, 2-methoxycarbonylethyl, 2- or 3-methoxycarbonylpropyl, 2-ethoxycarbonylethyl, 2- or 3-ethoxycarbohylpropyl, 2-methoxycarbonyloxyethyl, 2- or 3-methoxycarbonyloxypropyl, 2-ethoxycarbonyloxyethyl, 2- or 3-ethoxycarbonyloxypropyl, 2-butoxycarbonyloxyethyl, 2- or 3-butoxycarbonyloxypropyl, 2-(2-phenylethoxycarbonyloxy)ethyl, 2- or 3-(2-phenylethoxycarbonyloxy)propyl, 2-(2-ethoxyethoxycarbonyloxy)ethyl or 2- or 3-(2-ethoxyethoxycarbonyloxy)propyl.

$Q^2$, $L^6$, $L^7$, $Z^3$ and $Z^4$ may each also be for example benzyl, 2-methylbenzyl, 1- or 2-phenylethyl, cyclopentyl, cyclohexyl, cycloheptyl or 2-, 3- or 4-methylphenyl.

$Z^1$ is for example methylsulfonylamino, ethylsulfonylamino, propylsulfonylamino, isopropylsulfonylamino, butylsulfonylamino, mono- or dimethylaminosulfonylamino, mono- or diethylaminosulfonylamino, mono- or dipropylaminosulfonylamino, mono- or diisopropylaminosulfonylamino, mono- or dibutylaminosulfonylamino or (N-methyl-N-ethylaminosulfonyl)amino.

$Z^6$ may also be for example, like $Z^5$ fluorine, chlorine or bromine.

$Z^6$ may also be for example benzyl, 2-methylbenzyl, 2,4-dimethylbenzyl, 2-methoxybenzyl, 2,4-dimethoxybenzyl, methylamino, ethylamino, propylamino, isopropylamino, butylamino, pentylamino, hexylamino, heptylamino, octylamino or 2-ethylhexylamino.

$Z^3$ and $Z^4$ may each also be for example allyl or methallyl.

$L^6$ combined with $L^7$ or $Z^3$ with $Z^4$ to form together with the nitrogen atom joining them together a five- or six-membered saturated heterocyclic radical, which may have further hetero atoms, can be for example pyrrolidinyl, piperidinyl, morpholinyl, piperazinyl or N-($C_1$–$C_4$-alkyl)piperazinyl.

Preferred mixture components are azo dyes of the formula I where $R^4$ is methyl and $R^1$, $R^2$ and $R^3$ are each independently of the others hydrogen, alkyl or alkoxyalkyl, each of which may have up to 15 carbon atoms and may be phenyl-, $C_1$–$C_4$-alkylphenyl-, $C_1$–$C_4$-alkoxyphenyl- or cyano-substituted, or a radical of the formula

$$[-(CH_2)_3-O]_p[-CH_2-CH_2-O]_n-R^6,$$

where n is 1, 2, 3 or 4, p is 0 or 1, and $R^6$ is $C_1$–$C_4$-alkyl or phenyl.

Preferred mixture components further include azo dyes of the formula I where D is derived from a diazo component that conforms to the formula Va, Vb, Vd or Vf, in which case $R^7$, $R^8$ and $R^9$ are each independently of the others alkyl, alkoxyalkyl, alkoxycarbonylalkyl or alkanoyloxyalkyl, each of which may have up to 10 carbon atoms, hydrogen, cyano, halogen, nitro or a radical of the formula —CO—$OR^{19}$, —CO—$NR^{19}R^{20}$, —$SO_2$—$R^{19}$, —$SO_2$—$OR^{19}$ or —$SO_2$—$NR^{19}R^{20}$, where $R^{19}$ and $R^{20}$ are each independently of the other alkyl, alkoxyalkyl, alkoxycarbonylalkyl or alkanoyloxyalkyl, each of which may have up to 10 carbon atoms, hydrogen or a radical of the formula $$[-CH_2-CH_2-O]_n-R^5$$

where $R^5$ and n are each as defined above.

Preferred mixture components further include azo dyes of the formula I where D is derived from a diazo component that conforms to the formula Vc where $R^{10}$ is hydrogen, chlorine, $C_1$-$C_8$-alkyl, unsubstituted or $C_1$-$C_4$-alkyl- or $C_1$-$C_4$-alkoxy-substituted phenyl or benzyl, $R^{11}$ is cyano or a radical of the formula —CO—$OR^{19}$ or —CO—$NR^{19}R^{20}$, where $R^{19}$ and $R^{20}$ are each as defined above, and $R^{12}$ is a radical of the formula $$-CH=C\begin{matrix}CN\\CN\end{matrix}, \quad -CH=C\begin{matrix}CN\\CO-OR^{19}\end{matrix} \quad \text{or}$$

$$-CH=C\begin{matrix}CN\\CO-NR^{19}R^{20}\end{matrix},$$

where $R^{19}$ and $R^{20}$ are each as defined above.

Preferred mixture components further include azo dyes of the formula I where D is derived from a diazo component that conforms to the formula Ve where $R^{10}$ is hydrogen, chlorine, $C_1$-$C_8$-alkyl, unsubstituted or $C_1$-$C_4$-alkyl- or $C_1$-$C_4$-alkoxy-substituted phenyl or benzyl, and $R^{12}$ is cyano, nitro, formyl or a radical of the formula —CO—$OR^{19}$, where $R^{19}$ is as defined above Preferred mixture components further include azo dyes of the formula I where D is derived from a diazo component that conforms to formula Vg where $R^{10}$ is $C_1$-$C_8$-alkyl, $C_1$-$C_8$-alkoxy, alkoxyalkyl which may have up to 8 carbon atoms, unsubstituted or $C_1$-$C_4$-alkyl- or $C_1$-$C_4$-alkoxy-substituted phenyl, benzyl or benzyloxy and $R^{11}$ is cyano, nitro or a radical of the formula —CO—$OR^{19}$, where $R^{19}$ is as defined above.

Preferred mixture components further include azo dyes of the formula I where D is derived from a diazo component that conforms to the formula Vc where $R^{10}$ is hydrogen, chlorine, $C_1$-$C_8$-alkyl, $C_1$-$C_8$-alkoxy, alkoxyalkyl, which may have up to 8 carbon atoms, unsubstituted or $C_1$-$C_4$-alkyl- or $C_1$-$C_4$-alkoxy -substituted phenyl or benzyl or a radical of the formula —CO—$OR^{19}$, where $R^{19}$ is as defined above, $R^{11}$ is cyano or the radical of the formula —CO—$OR^{19}$, where $R^{19}$ is as defined above, and $R^{12}$ is cyano, nitro, formyl or a radical of the formula —CO—$OR^{19}$, where $R^{19}$ is as defined above.

Particularly interesting mixture components are azo dyes of the formula I where D is derived from a diazo component that conforms to the formula Va, Vb, Vc, Vd, Ve, Vf or Vg.

Particularly interesting mixture components further include azo dyes of the formula I where D is derived from a diazo component that conforms to the formula $$\text{structure with } R^7\text{-phenyl}-N=N-\text{benzene ring with } CN, CN, NH_2 \text{ substituents}$$

where $R^7$ is as defined above.

Preferred mixture components also include dyes of the formula II or III where $L^3$ is cyano.

Preferred mixture components further include dyes of the formula II or III where $L^2$ is derived from a component of the benzene, indole, quinoline, aminonaphthalene, aminothiazole or aminothiophene series.

Preferred mixture components further include dyes of the formula II or III where $L^1$ is $C_1$-$C_{12}$-alkyl, which may be substituted by $C_1$-$C_6$-alkanoyloxy, by $C_1$-$C_8$-alkoxycarbonyl, whose alkyl chain may be interrupted by 1 or 2 oxygen atoms in ether function, by phenyl or by $C_1$-$C_4$-alkylphenyl and may be interrupted by 1 or 2 oxygen atoms in ether function.

Particularly preferred mixture components are dyes of the formula II or III where $L^1$ is alkyl, alkoxyalkyl, alkanoyloxyalkyl or alkoxycarbonyloxyalkyl, which may each have up to 12 carbon atoms, unsubstituted or methyl-substituted benzyl or unsubstituted or methyl-substituted phenyl.

Particularly preferred mixture components further include dyes of the formula II or III where $L^2$ is a radical of the abovementioned formula VIa, VIc, VII, VIm, VIn or VIo.

Preference for use as mixture components is given to dyes of the formula IV where $L^2$ is a radical of the formula VIa, VIc, VII, VIm, VIn, VIo or VIp, of which a radical VIc or VII is particularly suitable.

Particular emphasis for use as mixture components is also given to dyes of the formula IVa $$\text{(IVa)}$$

structure with substituents $B^1, B^2, B^3, B^4, B^5, B^6$, X, CN where

X is CH or nitrogen, $B^1$ and $B^2$ are each independently of the other hydrogen, $C_1$-$C_8$-alkyl, phenyl, tolyl, $C_1$-$C_8$-alkylcarbonyl, $C_1$-$C_8$-alkylsulfonyl, phenylsulfonyl, tolylsulfonyl, pyridylsulfonyl, benzoyl, methylbenzoyl, pyridyl -carbonyl or thienylcarbonyl, $B^3$ is hydrogen, methyl, methoxy or the radical —$NHCOR^{10}$ or —$NHCO_2R^{10}$, where $R^{10}$ is phenyl, benzyl, tolyl or $C_1$-$C_8$-alkyl, which may be interrupted by one or two oxygen atoms in ether function, $B^4$ and $B^5$ are each independently of the other hydrogen, $C_1$-$C_8$-alkyl, 2-cyanoethyl, benzyl, $C_1$-$C_4$- alkanoyloxy -$C_2$-$C_4$-alkyl, $C_1$-$C_4$-alkoxycarbonyl-$C_1$-$C_4$-alkyl or $C_1$-$C_4$-alkoxycarbonyloxy-$C_2$-$C_4$-alkyl and $B^6$ is hydrogen or methyl.

Particular emphasis for use as mixture components is also given to dyes of the formula IVb

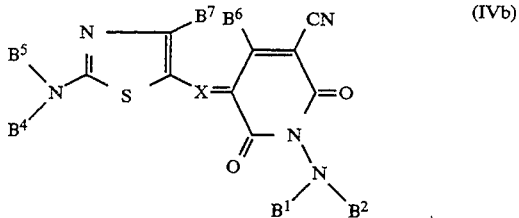

where X is CH or nitrogen, $B^7$ is $C_1$-$C_6$-alkyl, phenyl, tolyl, anisidyl, benzyl, cyclohexyl or thienyl and $B^1$, $B^2$, $B^4$, $B^5$ and $B^6$, are each as defined under the formula IVa.

Very particular emphasis is given to dyes of the formula IVa or IVb where $B^1$ and $B^2$ are each independently of the other $C_1$-$C_8$-alkylcarbonyl, benzoyl, methylbenzoyl or thienylcarbonyl.

Very particular emphasis is further given to dyes of the formula VIb where X is CH.

Emphasis is given to dye mixtures comprising an azo dye of the formula I and a dye of the formula II.

Emphasis is further given to dye mixtures comprising an azo dye of the formula I and a dye of the formula III.

Emphasis is further given to dye mixtures comprising an azo dye of the formula I and a dye of the formula IV.

Particular emphasis is given to dye mixtures comprising an azo dye of the formula I where D is a radical derived from a diazo component of the formula Vc or Vg, in particular Vc, and a dye of the formula II where $L^2$ is a radical of the formula VII.

Particular emphasis is further given to dye mixtures comprising an azo dye of the formula I where D is a radical derived from a diazo component of the formula Vc or Vg, in particular Vc, and a dye of the formula III where $L^2$ is a radical of the formula VII.

Emphasis is further given to dye mixtures comprising an azo dye of the formula I where D is a radical derived from a diazo component of formula Vc or Vg, in particular Vc, and a dye of the formula IV where $L^2$ is a radical of the formula VII.

The dye mixtures of the invention generally contain from 10 to 90% by weight, preferably from 40 to 80% by weight, in particular from 40 to 60% by weight, each percentage being based on the weight of the dye mixture, of one or more azo dyes of the formula I and also from 10 to 90% by weight, preferably from 20 to 60% by weight, in particular from 40 to 60% by weight, each percentage being based on the weight of the dye mixture, of one or more dyes of the formula II, III and/or IV.

The novel dye mixtures can be obtained in a conventional manner, for example by mixing the individual dyes in the abovementioned weight ratio.

The azo dyes of the formula I are known per se and described for example in US-A-4 939 118 or can be obtained by the methods mentioned therein.

The dyes of the formula II, III and IV are likewise known and described for example in US-A-5 079 365 and the earlier patent application PCT/EP/92/00505.

The dye mixtures of the invention are notable for advantageous application properties. They show high solubility in the color ribbon (high compatibility with the binder), high stability in the printing ink, good transferability, high image stability (i.e. good light fastness and also good stability to ambient influences, for example humidity, temperature or chemicals) and permit flexible coloristic adaptation to the other subtractive primaries resulting in high-quality color spaces.

Of particular noteworthiness is the spectrally uniform decay rate of the individual components on irradiation, is the dye which has the inferior light fastness as an individual dye does not decay preferentially.

The present invention also provides a process for transferring dyes from a transfer to plastic-coated paper by diffusion or sublimation by means of an energy source, which comprises using a transfer on which there is a dye mixture as defined at the beginning.

The dye transfers required for the process of the invention are prepared as follows. The dye mixtures are incorporated in a suitable organic solvent or in mixtures of solvents with one or more binders and with or without assistants to form a printing ink. It preferably contains the dye mixture in a molecularly dispersed, i.e. dissolved, form. The printing ink can then be knife coated onto an inert substrate and air dried. Suitable organic solvents for the dye mixtures are for example those in which the solubility of the dye mixtures at 20° C. is greater than 1% by weight, preferably greater than 5% by weight.

Examples are ethanol, propanol, isobutanol, tetrahydrofuran, methylene chloride, methyl ethyl ketone, cyclopentanone, cyclohexanone, toluene, chlorobenzene and mixtures thereof.

As binders it is possible to use any resin or polymer material that is soluble in organic solvents and capable of binding the dye mixture to the inert substrate in such a way that it will not rub off. Preference is here given to those binders which, after the air drying of the printing ink, hold the dye mixture in the form of a clear, transparent film in which no visible crystallization of the dye mixture will occur.

Binders of this type are mentioned for example in EP-A-441 282 and in patent applications cited therein. Other possibilities are saturated linear polyesters.

Preferred binders are ethylcellulose, ethylhydroxyethylcellulose, polyvinyl butyrate, polyvinyl acetate, cellulose propionate and saturated linear polyesters.

The weight ratio of a binder to dye mixture is in general within the range from 1:1 to 10:1.

Suitable assistants are for example release agents as mentioned in said EP-A-441 282 and patent applications cited therein. It is also possible to use in particular organic additives which prevent crystallization of the transfer dyes in the course of storage or on heating of the color ribbon, for example cholesterol or vanillin.

Suitable inert substrates are described for example in said EP and patent applications cited therein. The thickness of the substrate is in general from 3 to 30 μm, preferably from 5 to 10 μm.

The dye receptor layer can be basically any thermally stable plastic layer that possesses affinity for the dyes to be transferred, for example modified polycarbonates or polyesters. Further details may be found for example in said EP and patent applications cited therein.

The transfer is effected by means of an energy source, for example by means of a laser or by means of a thermal head that must be heatable to ≧300° C. in order for dye transfer to take place within the time range t:0<- t<15 msec. In the course of transfer, the dye migrates out of the transfer sheet and diffuses into the surface coating of the receiving medium.

The dye mixtures of the invention are also advantageous for dyeing synthetic materials, for example polyesters, polyamides or polycarbonates. Of particular suitability are textile fabrics made of polyester or polyamide or polyester-cotton blend fabrics.

The novel dye mixtures are also advantageous for preparing color filters as described for example in EP-A-399 473.

Finally, they can also be used with advantage as colorants for preparing toners for electrophotography.

Embodiments of the invention will now be more particularly described in more detail by way of example.

EXAMPLES

Table 1 below lists the individual dyes used as mixture components.

TABLE 1

| Dye No. | Structure |
|---|---|
| 1 | 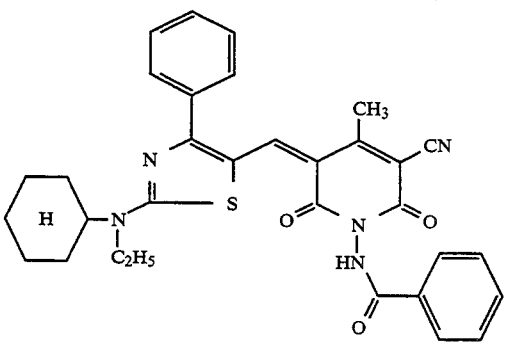 |
| 2 | 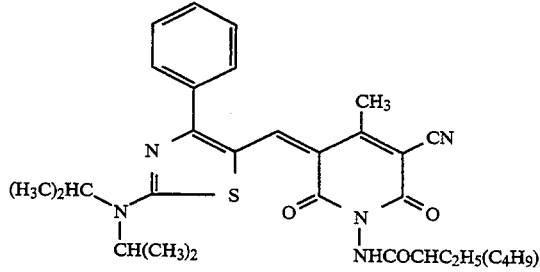 Dye No. 2 in impure form (Content: about 90%) |
| 3 | |
| 4 | |
| 5 | |

TABLE 1-continued

| Dye No. | Structure |
|---|---|
| 5 | 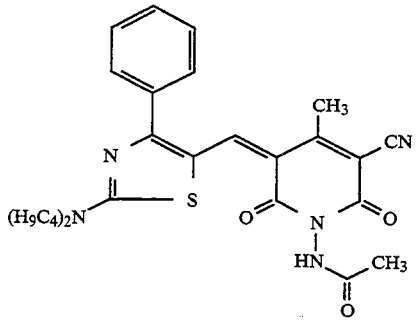 |
| 6 | |
| 7 | 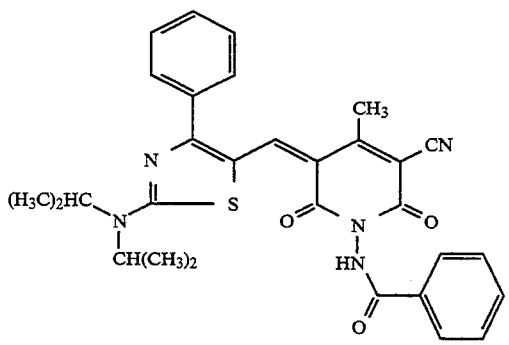 |
| 8 | 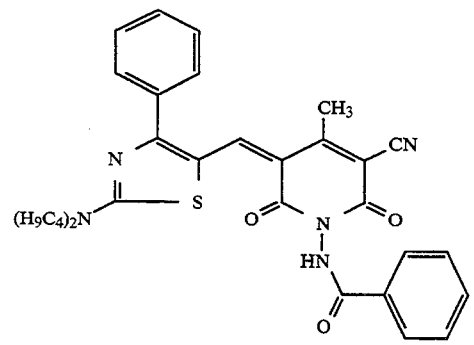  |
| 9 | 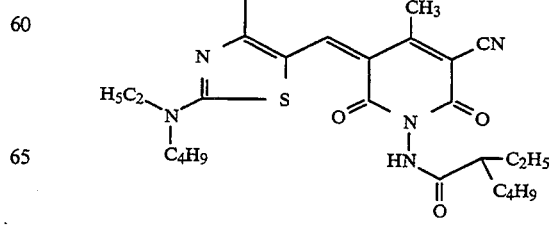 |

TABLE 1-continued
| Dye No. | Structure |
|---|---|
| 9 | 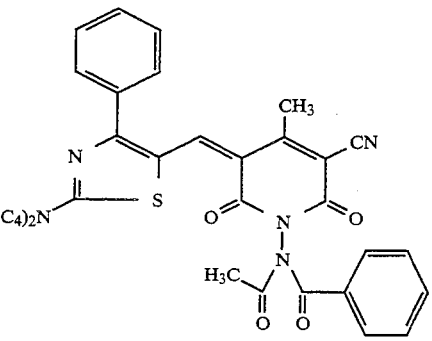 |
| 10 | 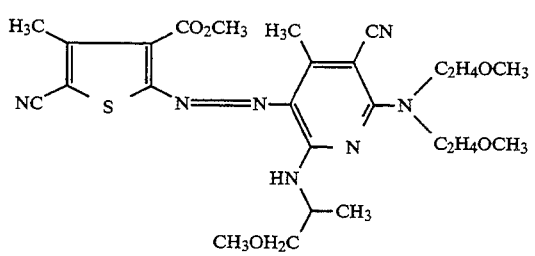 |
| 11 | 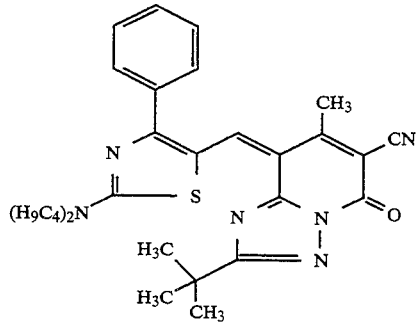 |
| 12 | 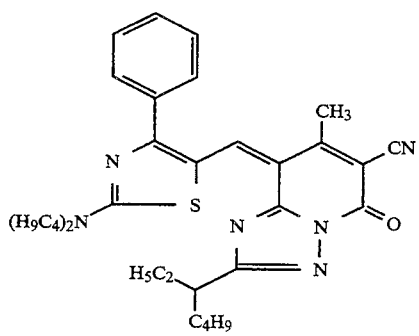 |
| 13 | 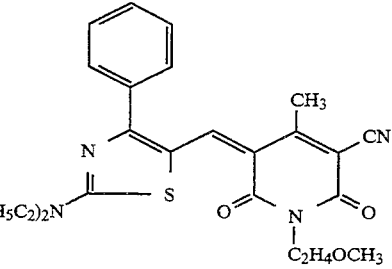 |
| 14 | 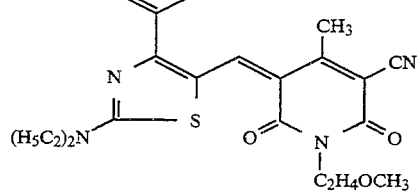 |
Dye No. 14 in slightly impure form (Content about 98%)
| 15 | Dye No. 14 in crude form (Content about 95%) |
|---|---|
| 16 | 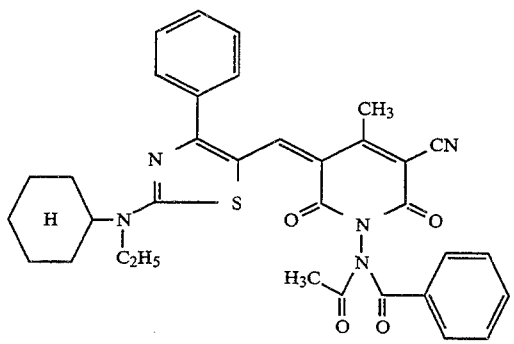 |
| 17 | 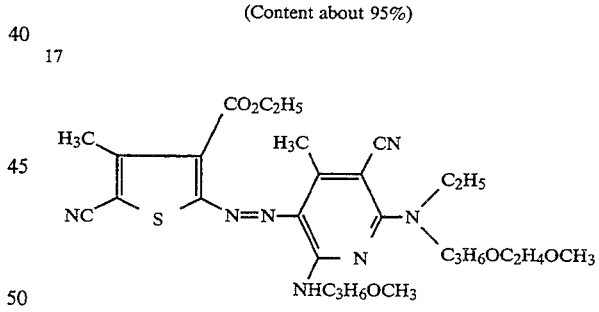 |
| 18 | 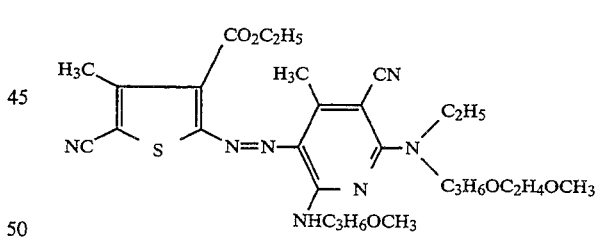 |
| 19 | 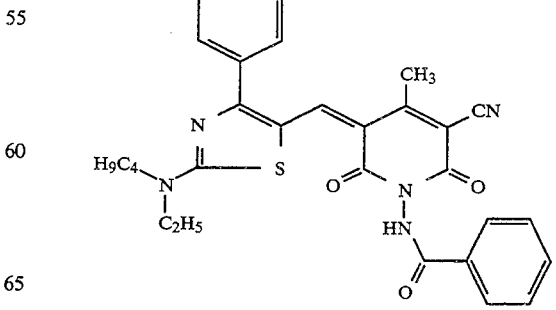 |

TABLE 1-continued

| Dye No. | Structure |
|---|---|
| 19 | (thiophene-CH₃, CN, NC, S)—N=N—(pyridine ring with CH₃, CN, N(C₂H₅)₂, HN-C₃H₆OC₂H₄OC₆H₅) |
| 20 | (thiophene-CH₃, CN, NC, S)—N=N—(pyridine ring with CH₃, CN, NHC₃H₆OC₂H₅, HN-C₃H₆OC₂H₄OC₆H₅) |
| 21 | (thiophene-CH₃, CO₂CH₃, NC, S)—N=N—(pyridine ring with CH₃, CN, N(C₃H₆OCH₃)(C₂H₅), HN-C₃H₆OCH₃) |
| 22 | (thiophene-CH₃, CO₂CH₃, NC, S)—N=N—(pyridine ring with CH₃, CN, N(C₃H₆OC₂H₄OCH₃)(C₂H₅), HN-CH(CH₃)CH₂OCH₃) |
| 23 | (thiophene-CH₃, CO₂CH₃, NC, S)—N=N—(pyridine ring with CH₃, CN, N(C₃H₆OCH₃)(C₂H₅), HN-CH(CH₃)CH₂OCH₃) |
| 24 | (thiophene-CH₃, CO₂CH₃, H₃CO₂C, S)—N=N—(pyridine ring with CH₃, CN, N(CH₂CH(CH₃)CH₃)₂, HN-C(CH₃)(C₂H₅)CH₃) |
| 25 | (thiophene-CH₃, CN, H₃CO₂C, S)—N=N—(pyridine ring with CH₃, CN, N(C₂H₅)(C₃H₆OCH₃), HN-CH(CH₃)CH₂OCH₃) |
| 26 | (thiophene-CH₃, CN, H₃CO₂C, S)—N=N—(pyridine ring with CH₃, CN, N(C₂H₄OCH₃)₂, HN-CH(CH₃)CH₂OCH₃) |
| 27 | (thiophene-CH₃, CN, H₃CO₂C, S)—N=N—(pyridine ring with CH₃, CN, N(C₂H₅)(C₃H₆OC₂H₄OCH₃), HN-CH(CH₃)CH₂OCH₃) |
| 28 | (thiophene-CH₃, CN, H₃CO₂C, S)—N=N—(pyridine ring with CH₃, CN, N(C₂H₄OCH₃)₂, HN-CH(CH₃)C₃H₆CH(CH₃)CH₃) |

Table 2 below lists the light fastness (LF) of the individual dyes 1 to 28 and their thermal stability (TS). The value reported here and hereinafter as a measure of the light fastness is the number of hours of irradiation after which 20% of the dye quantity originally present had been destroyed.

The thermal stability is determined by storing the prints in a drying cabinet at 70° C. for 1 week. It is assessed on a scale from 1 to 6, where 1 denotes very good and 6 inadequate.

TABLE 2

| Dye No. | LE | TS |
| --- | --- | --- |
| 1 | 300 | 1 |
| 2 | 40 | 3+ |
| 3 | 11 | 2+ |
| 4 | 12 | 2 |
| 5 | 28 | 3 |
| 6 | 14 | 1 |
| 7 | 13 | 1 |
| 8 | 8 | 1 |
| 9 | 43 | 2+ |
| 10 | 136 | 2+ |
| 11 | 9 | 2 |
| 12 | 8 | 4 |
| 13 | 14 | 2+ |
| 14 | 40 | 3+ |
| 15 | 45 | 2 |
| 16 | 31 | 3 |
| 17 | 77 | 1 |
| 18 | 7 | 2+ |
| 19 | 102 | 1 |
| 20 | 75 | 1 |
| 21 | 139 | 1 |
| 22 | 162 | 1 |
| 23 | | |
| 24 | 142 | 2 |
| 25 | 59 | 1 |
| 26 | 63 | 3 |
| 27 | 72 | 2+ |
| 28 | 67 | 3 |

The dye mixtures used hereinafter all contain the dyes in a weight ratio of 1:1.

General Method:

a) 10 g of dye mixture are stirred with or without brief heating to 80°–90° C. into 100 g of a 10% strength by weight solution of a binder (Vylon TM 290 from Toyobo) in 4.5:2:2 v/v/v methyl ethyl ketone/toluene/cyclohexanone.

The printing ink is applied with a 6 μm doctor to a polyester film 6 μm in thickness whose back has been coated with a suitable lubricating layer and is blown dry with a hair dryer in the course of 1 minute. Before the color ribbon is used for printing, it subsequently has to air dry for at least 24 hours, since residual solvent can impair the printing process.

b) The color ribbons are printed in a computer controlled experimental setup equipped with a commercial thermal printing head onto Hitachi VY-S Video Print Paper.

The energy emitted by the thermal printing head is controlled by varying voltage with a pulse duration setting of 7 ms and only one pulse being emitted. The emitted energy is within the range from 0.7 to 2.0 mJ/dot.

Since the degree of coloration is directly proportional to the energy supplied, it is possible to produce a color wedge and analyze it spectroscopically.

The plot of the depth of shade versus the energy supplied per heating element is used to determine the Q* value (=energy in mJ for the absorbance value 1) and the slope m in 1/mJ.

The results obtained are listed below in Table 3, which additionally shows the light fastness and the thermal stability.

TABLE 3

| Mixture of dyes | LE | TS | Q* | m* |
| --- | --- | --- | --- | --- |
| 17/6 | 106 | 1 | 1.00 | 2.27 |
| 17/4 | 99 | 1 | 1.00 | 2.11 |
| 17/7 | 88 | 1 | 1.05 | 1.88 |
| 17/13 | 78 | 1 | 0.89 | 2.52 |
| 17/5 | 77 | 1 | 1.03 | 1.95 |
| 17/18 | 77 | 1 | 1.01 | 2.07 |
| 17/8 | 75 | 1 | 1.02 | 1.84 |
| 20/2 | 87 | 2+ | 1.06 | 1.94 |
| 20/6 | 75 | 1 | 1.07 | 1.75 |
| 20/16 | 74 | 2 | 1.08 | 2.02 |
| 19/6 | 113 | 1 | 1.05 | 1.94 |
| 19/5 | 90 | 1 | 1.04 | 1.86 |
| 19/15 | 87 | 2+ | 1.02 | 2.26 |
| 19/4 | 80 | 1 | 0.94 | 2.61 |
| 19/14 | 74 | 2 | | |
| 19/9 | 101 | 2* | | |
| 10/6 | 133 | 1 | 1.01 | 1.98 |
| 10/4 | 113 | 1 | 1.02 | 1.92 |
| 10/5 | 104 | 1 | 1.08 | 1.94 |
| 10/11 | 94 | 2 | | |
| 10/9 | 100 | 2 | | |
| 10/12 | 89 | 2 | | |
| 10/8 | 88 | 1 | 1.00 | 2.09 |
| 10/7 | 81 | 1 | 1.03 | 2.08 |
| 10/13 | 75 | 1 | 0.93 | 3.16 |
| 21/6 | 125 | 1 | 1.01 | 2.10 |
| 21/9 | 116 | 2+ | | |
| 21/4 | 105 | 1 | 0.97 | 2.18 |
| 21/3 | 99 | 2 | 1.03 | 2.07 |
| 21/14 | 97 | 2+ | 0.99 | 2.42 |
| 21/8 | 83 | 1 | 0.98 | 2.30 |
| 21/5 | 78 | 1 | 1.01 | 2.10 |
| 21/15 | 77 | 2+ | | |
| 21/7 | 72 | 1 | 1.03 | 2.07 |
| 1/2 | 185 | 2 | 0.95 | 2.90 |
| 1/7 | 187 | 2+ | 1.08 | 2.13 |
| 1/4 | 166 | 2 | 0.99 | 2.28 |
| 1/5 | 153 | 2 | 0.96 | 2.29 |
| 1/6 | 138 | 1 | 1.02 | 2.31 |
| 1/3 | 127 | 2+ | 1.09 | 1.98 |
| 1/8 | 93 | 2 | 0.97 | 2.36 |
| 1/9 | 100 | 2+ | 0.88 | 3.28 |
| 9/22 | 78 | 2+ | | |
| 9/23 | 73 | 2+ | | |
| 9/24 | 85 | 2 | | |
| 9/25 | 62 | 2 | | |
| 9/26 | 72 | 2+ | | |
| 9/27 | 62 | 2+ | | |
| 9/28 | 66 | 2 | | |

We claim:

1. Dye mixtures comprising at least one azo dye of the formula I

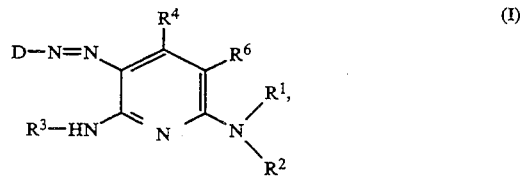

where $R^1$, $R^2$ and $R^3$ are identical or different and each is independently of the others alkyl, alkoxyalkyl, alkanoyloxyalkyl, alkoxycarbonyloxyalkyl or alkoxycarbonylalkyl, each of which may have up to 20 carbon atoms and be phenyl-, $C_1$–$C_4$-alkylphenyl-, $C_1$–$C_4$-alkoxyphenyl-, halophenyl-, benzyloxy-, $C_1$–$C_4$-alkylbenzyloxy-, $C_1$–$C_4$-alkoxybenzyloxy, halobenzyloxy-, halogen-, hydroxyl- or cyano-substituted, hydrogen, unsubstituted or $C_1$–$C_4$-alkyl- or $C_1$–$C_4$-alkoxy-, halogen- or benzyloxy-substituted cyclohexyl or a radical of the formula $$[-E-O]_m-R^5,$$

where

E is $C_2-C_6$-alkylene,

M is 1, 2, 3, 4, 5 or 6, and $R^5$ is $C_1-C_4$-alkyl or unsubstituted or $C_1-C_4$-alkyl- or $C_1-C_4$-alkoxy-substituted phenyl, $R^4$ is $C_1-C_4$-alkyl, $R^6$ is cyano or carbamoyl, and D is the radical of a diazo component, and at least one dye of the formula II, III and/or IV

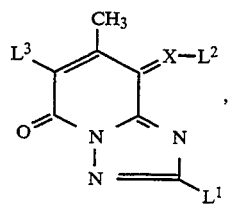
(II)

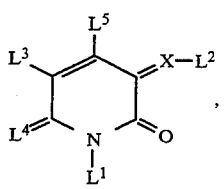
(III)

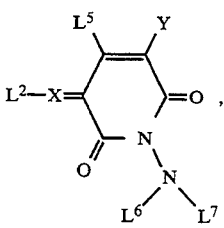
(IV)

where $L^1$ is $C_1-C_{20}$-alkyl, which may be substituted and may be interrupted by from 1 to 4 oxygen atoms in ether function, substituted or unsubstituted phenyl or hydroxyl, $L^2$ is a 5- or 6-membered carbocyclic or heterocyclic radical, $L^3$ is cyano, carbamoyl, carboxyl or $C_1-C_4$-alkoxycarbonyl, $L^4$ is oxygen or a radical of the formula

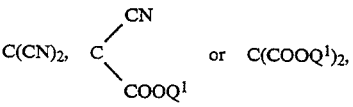

where $Q^1$ is in each case $C_1-C_8$-alkyl, which may be interrupted by 1 or 2 oxygen atoms in ether function, X is CH or nitrogen, $L^5$ is hydrogen or $C_1-C_4$-alkyl, $L^6$ and $L^7$ are identical or different and each is independently of the other hydrogen, substituted or unsubstituted $C_1-C_{12}$-alkyl, $C_5-C_7$-cycloalkyl, substituted or unsubstituted phenyl, substituted or unsubstituted pyridyl, substituted or unsubstituted $C_1-C_{12}$-alkanoyl, $C_1-C_{12}$-alkoxycarbonyl, substituted or unsubstituted $C_1-C_{12}$-alkylsulfonyl, $C_5-C_7$-cycloalkylsulfonyl, substituted or unsubstituted phenylsulfonyl, substituted or unsubstituted pyridylsulfonyl, substituted or unsubstituted benzoyl, pyridylcarbonyl or thienylcarbonyl, or together with the nitrogen atom joining them together are unsubstituted or $C_1-C_4$-alkyl-substituted succinimido, unsubstituted or $C_1-C_4$-alkyl -substituted phthalimido or a five- or six-membered saturated heterocyclic radical, which may contain further hetero atoms, Y is cyano or a radical of the formula $CO-Q^2$, $CO-OQ^2$ or $CO-NHQ^2$, where $Q^2$ is hydrogen, $C_1-C_8$-alkyl, which may be substituted and may be interrupted by 1 or 2 oxygen atoms in ether function, $C_5-C_7$-cycloalkyl, phenyl or tolyl, the dye mixture containing from 10 to 90% by weight of the dye mixture of dye of formula I and 90 to 10% by weight of the dye mixture of one or dyes of the formulas II, III and/or IV.

2. Dye mixtures as claimed in claim 1 comprising an azo dye of the formula I and a dye of the formula II.

3. Dye mixtures as claimed in claim 1 comprising an azo dye of the formula I and a dye of the formula III.

4. Dye mixtures as claimed in claim 1 comprising an azo dye of the formula I and a dye of the formula IV.

5. Dye mixtures as claimed in claim 1 comprising from 10 to 90% by weight, based on the weight of the dye mixture, of one or more azo dyes of the formula I and also from 10 to 90% by weight, based on the weight of the dye mixture, of one or more dyes of the formula II, III and/or IV.

6. A process for transferring dyes from a transfer to plastic-coated paper by diffusion or sublimation by means of an energy source, which comprises applying an energy source to the transfer containing a dye mixture as claimed in claim 1.

* * * * *